(12) United States Patent  (10) Patent No.: US 7,845,441 B2
Chambers  (45) Date of Patent: Dec. 7, 2010

(54) ADVANCED CONTROL FOR POWERED HAND TRUCK

(76) Inventor: Steven J. Chambers, 12743 Venice Blvd., Los Angeles, CA (US) 90066

( * ) Notice: Subject to any disclaimer, the term of this patent is extended or adjusted under 35 U.S.C. 154(b) by 850 days.

(21) Appl. No.: 11/510,932

(22) Filed: Aug. 28, 2006

(65) Prior Publication Data

US 2007/0007051 A1   Jan. 11, 2007

Related U.S. Application Data

(63) Continuation-in-part of application No. 10/761,089, filed on Jan. 20, 2004, now Pat. No. 7,163,213.

(51) Int. Cl.
B62D 51/04   (2006.01)
(52) U.S. Cl. ............... 180/19.1; 180/19.3; 180/272
(58) Field of Classification Search ........... 180/19.1, 180/19.3, 65.1, 272
See application file for complete search history.

(56) References Cited

U.S. PATENT DOCUMENTS

| | | | |
|---|---|---|---|
| 1,292,022 A | 1/1919 | Newman | |
| 2,996,133 A | 8/1961 | La Warre et al. | |
| 3,182,835 A | 5/1965 | Meyer et al. | |
| 3,499,501 A | 3/1970 | Fitzgerald et al. | |
| 3,719,247 A * | 3/1973 | Hollis | 180/19.3 |
| 3,896,893 A * | 7/1975 | Willis et al. | 180/19.1 |
| 4,033,595 A | 7/1977 | Mauch | |
| 4,136,888 A | 1/1979 | Bowie et al. | |
| 4,155,418 A * | 5/1979 | Tremblay et al. | 180/272 |
| 4,706,072 A * | 11/1987 | Ikeyama | 340/576 |
| 4,762,193 A | 8/1988 | Levine | |
| 4,792,052 A * | 12/1988 | Okuda et al. | 212/287 |
| 4,941,854 A * | 7/1990 | Takahashi et al. | 440/1 |
| 4,974,693 A | 12/1990 | Nakai et al. | |
| 5,322,306 A | 6/1994 | Coleman | |
| 5,746,282 A | 5/1998 | Fujiwara et al. | |
| 5,749,424 A * | 5/1998 | Reimers | 180/19.2 |
| 6,062,328 A | 5/2000 | Campbell et al. | |
| 6,098,732 A | 8/2000 | Romick et al. | |
| 6,173,799 B1 * | 1/2001 | Miyazaki et al. | 180/19.3 |
| 6,210,095 B1 | 4/2001 | Hempel et al. | |
| 6,474,427 B1 | 11/2002 | Tunnecliff | |
| 6,496,117 B2 * | 12/2002 | Gutta et al. | 340/576 |
| 2004/0238241 A1 | 12/2004 | Mitchell | |
| 2005/0081670 A1 * | 4/2005 | Kozu et al. | 74/473.1 |
| 2007/0193754 A1 * | 8/2007 | Beckman et al. | 172/41 |

* cited by examiner

*Primary Examiner*—Lesley Morris
*Assistant Examiner*—Maurice Williams
(74) *Attorney, Agent, or Firm*—Kenneth L. Green (57) ABSTRACT

An advanced control for a powered hand truck. The powered hand truck includes an electric motor, a power source, a programable motor controller, and a transaxle, which are adaptable to existing hand trucks, or may be integrated into a new powered hand truck. The motor controller controls the motor to provide consistent speed independent of load weight or incline, and further provides regenerative braking. The advanced control may be wired or wireless and provides a touch sensitive circuit to command stop if the operator is not holding the handle, and an electronic potentiometer. The wireless control further includes a unique code for validating speed commands and initiates deceleration if the control signal is lost.

13 Claims, 10 Drawing Sheets

ND CONTROL FOR POWERED
HAND TRUCK

The present application is a Continuation in Part of U.S. patent application Ser. No. 10/761,089, filed Jan. 20, 2004 now U.S. Pat. No. 7,632,213, which application is incorporated herein by reference.

BACKGROUND OF THE INVENTION

The present invention relates to a powered carrier, and more particularly to controls for a powered hand truck.

Hand trucks (or dollies) are well known and commonly used both residentially and commercially to move objects from place to place. Many improvements have been made over recent years to improve hand trucks, and current models provide quality and convenience. However, due to the geometry of basic hand trucks, they are limited to carrying objects of limited dimensions. Convertible hand trucks having four wheels have been developed which are able to carry objects too bulky for two wheel hand trucks.

Because of the high quality built into many hand trucks, they may be used to move very heavy objects. While these qualities have expanded the utility of hand trucks, the ability to carry heavy objects has also created greater weights for operators to deal with. Such heavy weight has created a need for some form of power assistance for hand truck operators. However, in order to retain the utility of the hand truck, the powered hand truck must have weight and dimensions similar to the prior art hand truck. Additionally, the powered hand truck must be controllable in a safe manner, and must allow manual use of the powered hand truck in the event that the power unit fails. Because there are many prior art hand trucks in use, there is a further need to easily convert manual hand trucks to powered hand trucks.

A powered hand truck resolving the above mentioned problems is described in U.S. patent application Ser. No. 10/761,089, filed Jan. 20, 2004 by the present Applicant. The '089 application describes a powered hand truck and a kit for converting a manual hand truck to a powered hand truck. The powered hand truck of the '089 application includes a speed control located on or near a handle used to steer the hand truck. Both a wired speed control and a wireless speed control are described therein. While the '089 application discloses many useful features for a powered hand truck, control improvements remain which may improve the control and safety of powered hand trucks.

BRIEF SUMMARY OF THE INVENTION

The present invention addresses the above and other needs by providing an advanced control for a powered hand truck. The powered hand truck includes an electric motor, a power source, a programable motor controller, and a transaxle, which are adaptable to existing hand trucks, or may be integrated into a new powered hand truck. The motor controller controls the motor to provide consistent speed independent of load weight or incline, and further provides regenerative braking. The advanced control may be wired or wireless and provides a touch sensitive circuit to command stop if the operator is not holding the handle, and an electronic potentiometer. The wireless control further includes a unique code for validating speed commands and initiates deceleration if the control signal is lost.

In accordance with one aspect of the invention, there is provided a wirelessly controlled powered hand truck. The powered hand truck includes a hand truck frame and a handle for steering the hand truck. An electric motor provides power for the hand truck and a transaxle driven by the electric motor has differentially connected right and left axles with right and left wheels attached to the right and left axles respectively. A power source provides electrical power for the motor and a motor controller controls the electrical power provided to the motor. A wireless control circuit includes a transmitter circuit and a receiver circuit. The transmitter circuit includes a first processor, an operator actuated speed control attached to the handle and generating a speed control command provided to the first processor, and at least one touch point residing proximal to the speed control at a location graspable by the operator during normal hand truck operation. The touch point generates a touch point signal provided to the first processor and a radio transmitter receiving a wireless speed control signal from the first processor and transmits the wireless speed control signal. The receiver circuit includes a second processor and a radio receiver which receives the wireless speed control signal and provides the wireless control signal to the second processor. An electronic potentiometer receives a potentiometer control signal generated by the second processor based on the wireless speed control signal and provides a motor controller speed command to the motor controller. The motor controller speed command is decreased if the touch point signal indicates that the operator is not touching at least one of the touch points.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

The present invention is a kit for powering hand trucks, and for powering convertible hand trucks in particular. The kit may be adapted to new hand trucks, used hand trucks, or may be incorporated into the initial manufacturing of hand trucks. The kit is particularly suitable for conversion of the Gemini® Jr. and Gemini® Sr. and similar hand trucks, for example, hand trucks manufactured by Harper Hand Trucks in Wichita, Kans. and by Cascade Equipment, to powered hand trucks, for assisting in the movement of objects.

Figures 1A, 1B, 2:
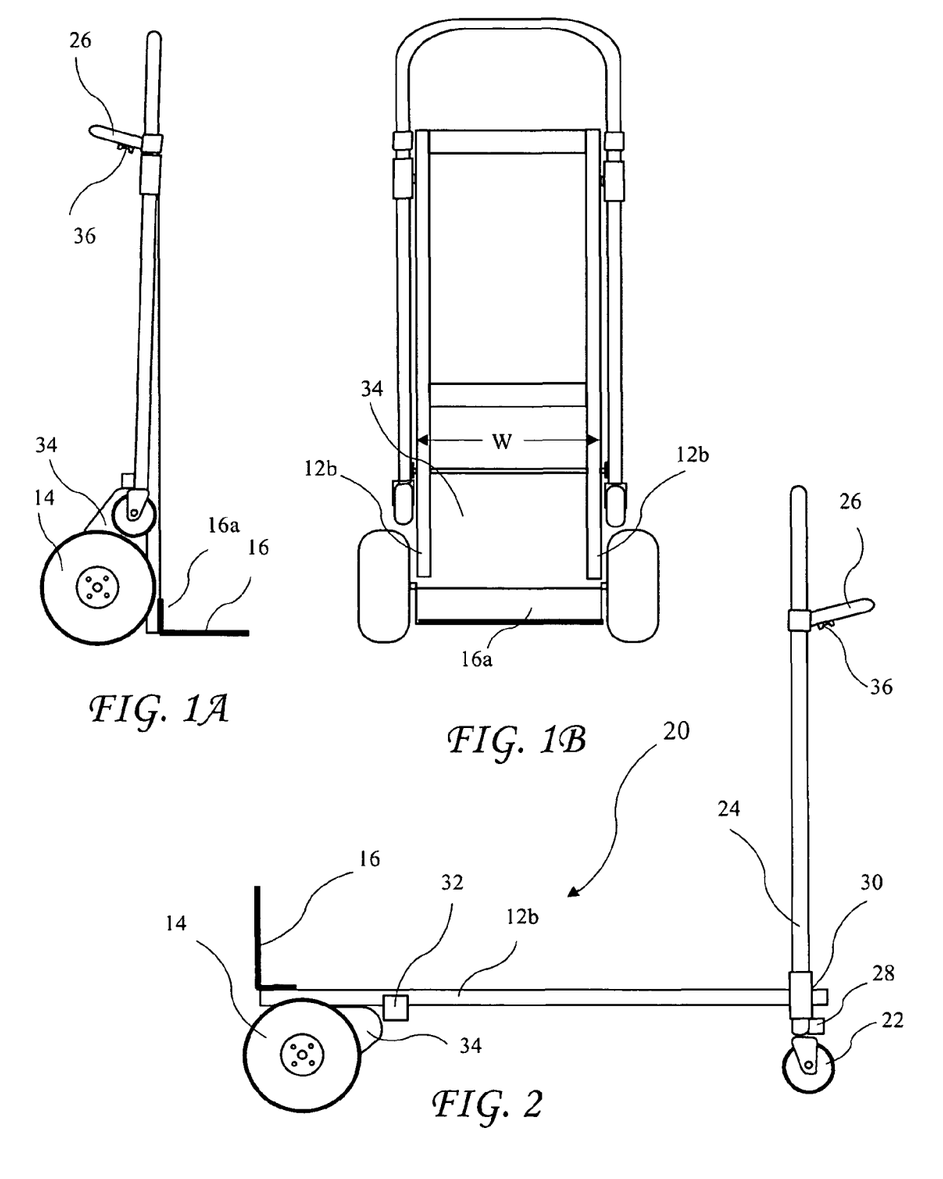
FIG. 1A is a side view of a power hand truck according to the present invention.
FIG. 1B is a front view of a power hand truck according to the present invention.
FIG. 2 is a side view of the power hand truck according to the present invention in a platform mode.

An example of a powered convertible hand truck is shown in FIG. 1A in side view, and in FIG. 1B in front view, and converted to four wheel operation in FIG. 2. A powering assembly 34 resides proximal to the hand truck wheels 14, and behind rear portion 16a of the nose 16, and fits substantially within the outer width W of the frame 12b, which outer width W is preferably between approximately ten inches to approximately eighteen inches, and is more preferably between approximately ten inches to approximately fourteen inches, and most preferably approximately twelve inches. The powering assembly 34 defines a rounded profile which tapers toward the hand truck handles 26. Such tapering aids in sliding the hand truck over obstacles, for example curbs, and provides protection for the internal components of the powering assembly 34. The frames 12b and 24 are preferably fabricated from aluminum or magnesium, and more preferably from aluminum, and the frame 12b may be characterized as a ladder-like frame.

Figure 3A:
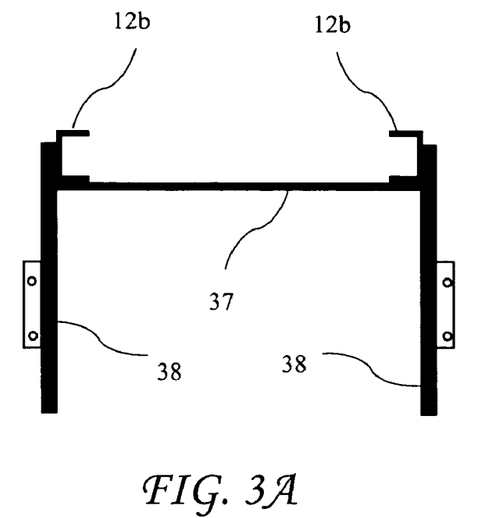
FIG. 3A is a top view of side plates and a back plate of the present invention attached to a hand truck frame.
Figure 3B:
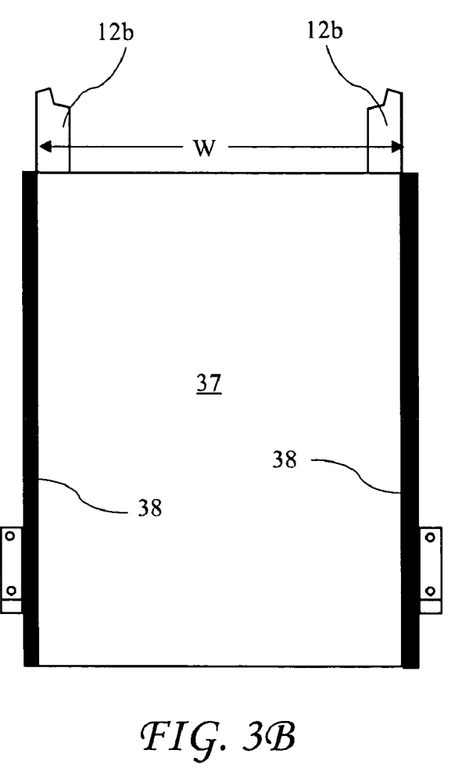
FIG. 3B is a rear view (with respect to the hand truck) of the side plates and the back plate of the present invention attached to the hand truck frame.
Figure 3C:
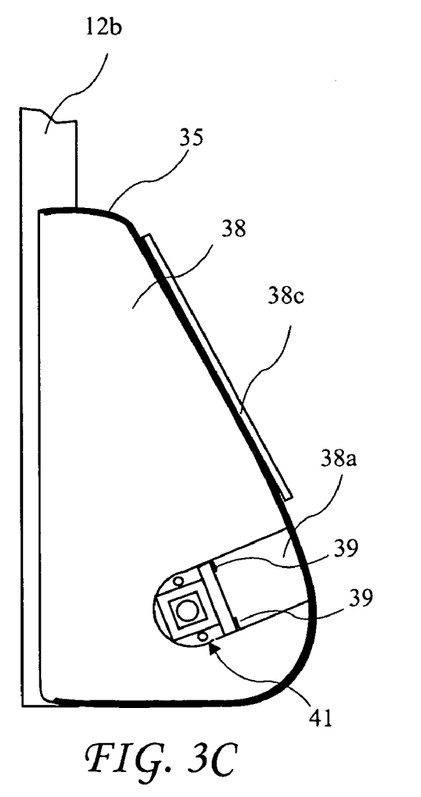
FIG. 3C is a side view (with respect to the hand truck) of the side plates and the back plate of the present invention attached to the hand truck frame.

The powering assembly 34 is attached to the side plates 38 and back plate 37. A top view of the side plates 38 and back plate 37 is shown in FIG. 3A. The side plates 38 and back plate 37 are attached to the second frame 12b. A rear view (with respect to the hand truck) of the side plates 38 and back plate 37 is shown in FIG. 3B, and a side view of one of the side plates 38 and back plate 37 is shown in FIG. 3C. An assembly cover 35 is shown in edge view in FIG. 3C and covers the rear and bottom of the powering assembly 34. The assembly cover 35 attaches to both side plates 38. Side plate skids 38c are attached to each side plate 38, through the assembly cover 35, to assist in sliding the hand truck over obstacles, for example, over curbs. The side plate skids 38c are preferably fabricated from polytetrafluoroethene (PTFE), but may be made from any material with similar characteristics.

Figure 4A:
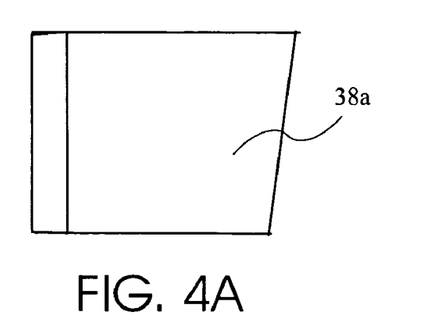
FIG. 4A is a side view of a side plate insert utilized to secure a transaxle to the side plate according to the present invention.
Figure 4B:
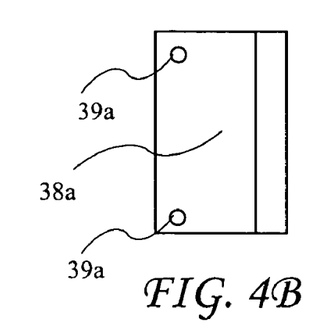
FIG. 4B is a rear view (with respect to the hand truck) of the side plate insert utilized to secure the transaxle to the side plate according to the present invention.
Figure 4C:
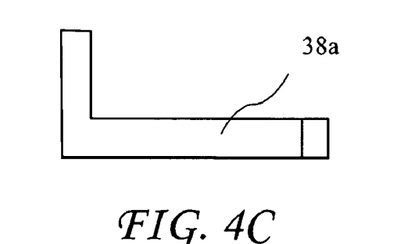
FIG. 4C is an edge view of the side plate insert utilized to secure the transaxle to the side plate according to the present invention.

A side plate insert 38a held in place by side plate insert fasteners 39 is shown in FIG. 3C. The fasteners 39 are preferably screws or bolts. Each side plate insert 38a fits into a cut out section of each side plate 38 and is substantially flush with the side plate 38. The side plate insert 38a cooperates with a transaxle block 41 to retain the transaxle 40 (see FIG. 5) in place. The transaxle 40 may be removed by removing the two side plate inserts 38a (i.e., the transaxle 40 may be removed by removing the four side plate insert bolts 39). Detailed side, rear (with respect to the hand truck) and edge views of the side plate insert 38a are shown in FIGS. 4A, 4B, and 4C respectively. Bolt holes 39a for mounting the side plate insert 38a are apparent in FIG. 4B.

Figure 5:
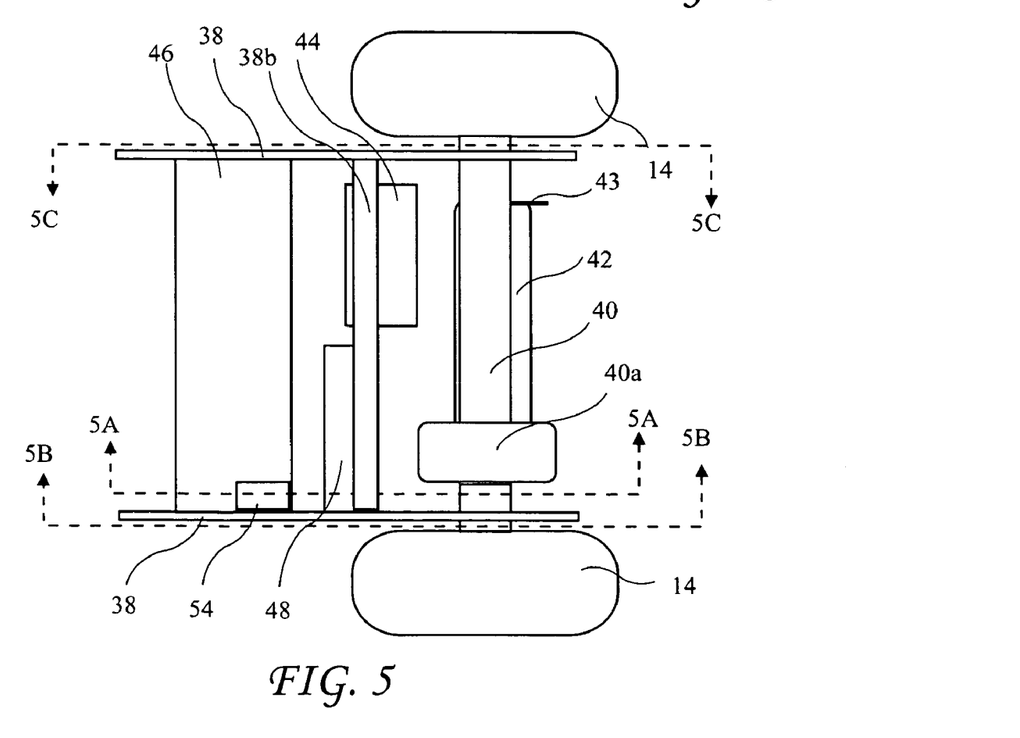
FIG. 5 is a rear view (with respect to the hand truck) of the powering assembly according to the present invention.
Figure 5A:
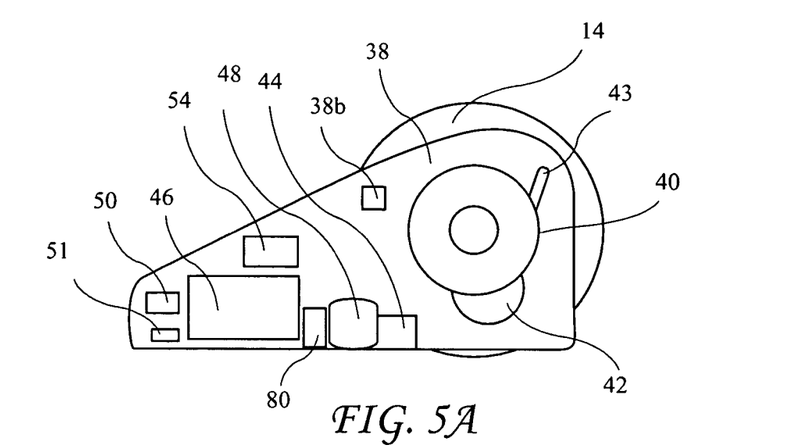
FIG. 5A is a cross-sectional view of the powering assembly taken along line 5A-5A of FIG. 5.
Figures 5B, 5C:
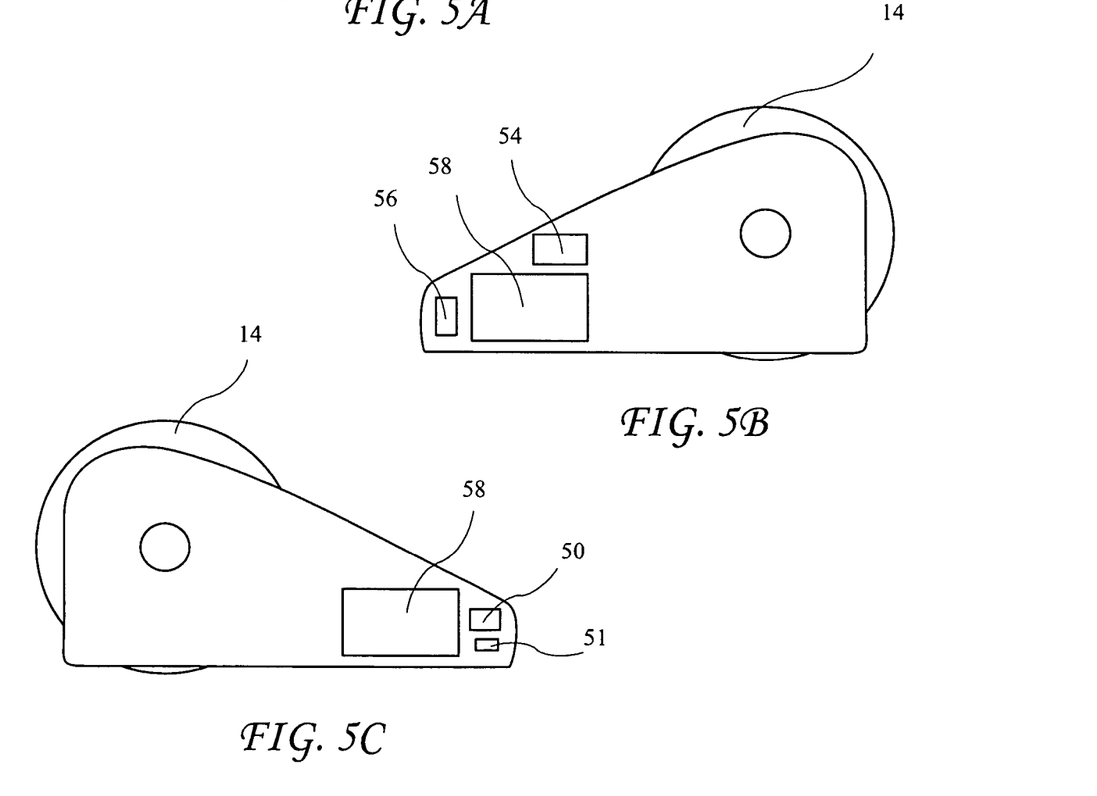
FIG. 5B is a cross-sectional view of the powering assembly taken along line 5B-5B of FIG. 5.
FIG. 5C is a cross-sectional view of the powering assembly taken along line 5C-5C of FIG. 5.

The internal components of the powering assembly 34 are shown in FIG. 5, and in cross-sectional views in FIGS. 5A, 5B, and 5C taken along lines 5A-5A, 5B-5B, and 5C-5C of FIG. 5 respectively. The powering assembly 34 includes as major components an electric motor 42, a power source 46, a programable motor controller 44, a receiver circuit 80 (see FIG. 9), a recharger 48, and a transaxle 40. The transaxle 40 includes a differential 40a which differentially connects right and left axles, thereby allowing easy maneuvering (e.g., turning) of the hand truck. The major components reside between side plates 38 and behind back plate 37. An electrical receptacle 54 resides in the left one of the side plates 38.

The transaxle 40 preferably is geared between sixteen to one and twenty five to one, and more preferably twenty one to one. The transaxle 40 is preferably between approximately sixteen inches and twenty three inches wide, and more preferably between approximately nineteen inches and approximately twenty two inches wide, and most preferably approximately 19.3 inches wide (where width is defined as from right axle tip to left axle tip). The transaxle 40 is preferably a limited slip transaxle. A preferred transaxle is reference number S23083, made by Stature Electric in Watertown, N.Y.

The motor 42 is preferably between approximately one quarter and approximately one half Horse Power (HP), and more preferably between approximately one quarter and approximately one third HP, and most preferably approximately one quarter HP. The motor 42 is further preferably an approximately twelve volt motor to an approximately thirty six volt motor, and more preferably an approximately twenty four volt motor. The motor 42 diameter is preferably between approximately three inches and approximately five inches, and is more preferably approximately three and one half inches. The motor 42 is oriented relative to the transaxle to provide maximum ground clearance without interfering with other powering assembly 34 components. Preferably motors are manufactured by Stature Electric in Watertown, N.Y., and by Euclid/Imperial Electric in Akron, Ohio. A manual brake is integrated into the motor 42 and is activated by a lever 43 extending rearwardly from the right rear of the motor 42.

The motor controller 44 preferably is a programable motor controller and controls the motor 42 to maintain a desired speed independent of load and/or incline. The motor controller 44 also provides regenerative braking. Programs may be saved by the motor controller 44 and downloaded into the motor controller 44. The motor controller 44 is switchable between low and high speeds, and the low speed and high speed may be programmed, acceleration may be programmed, and braking may be programmed. Active (i.e., using the motor 42) braking is also provided by the motor controller 44, wherein the hand truck speed is limited to a desired speed when the hand truck is descending an incline. The motor controller 44 is preferably an Off The Shelf (OTS) motor controller and is more preferably an i-Drive, made by PG Drives in Dorset, UK.

The power source 46 is preferably twelve volt, twenty four volt, or thirty six volt and preferably replaceable and/or rechargeable batteries, and more preferably two twelve volt batteries in series providing a total of twenty four volts and 7.2 amp-hr, and most preferably are two approximately six pound approximately 2.55 inch wide by approximately 3.75 inch high by approximately 6.00 inch length batteries. The batteries may be lead acid, lithium, nickel metal hydride, or nickel cadmium batteries. Advantageously, using two twelve volt batteries allows recharging from many common sources such as an automotive electrical system. The batteries preferably reside in series behind hinged access doors in a battery compartment, with central springs biasing the batteries outward for easy removal. Power source 46 voltage is displayed by voltage display 56 above the power source door 58 (FIG. 5B), and preferably voltage is displayed at all times. The voltage display 56 preferably has a zero to twenty eight volt range display.

The charger 48 is preferably a twenty four volt universal charger, and preferably a smart charger wherein, for example, the charger 48 charges at full charging rate until ninety percent of full charge is reached, and then the charger 48 switches to a trickle mode. A preferred charger is manufactured by Soniel in Canada.

A controller display 50 and on/off switch 51 reside above a right power source door 56 shown in FIG. 5C. The controller display 50 displays diagnostic information upon turn-on, preferably for three seconds. The display 50 provides information regarding brake and speed controls, and any other faults (i.e., wiring etc.) and is generated by the motor controller 44 software. After the initial display of diagnostic information, the display 50 provides power source 46 level.

Figure 6:
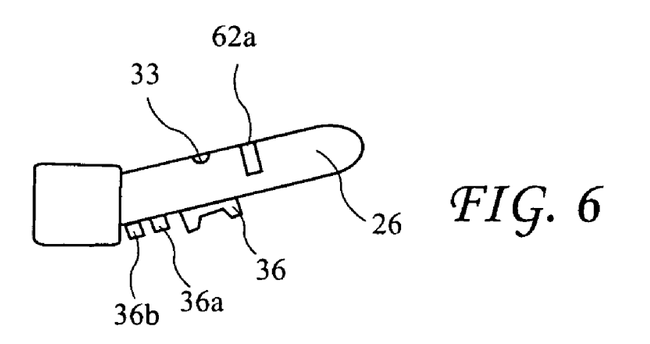
FIG. 6 is a hand truck handle including a speed control according to the present invention.

A detained view of the handle 26 (generally the right handle) is shown in FIG. 6. The speed control 36, an optional hi/low speed switch 36a, an optional on/off switch 36b, and an indicator 33 reside on the handle 36. The speed control 36 is a finger control (wig-wag) type switch. The switch 36 preferably has as much as approximately ± forty five degrees of motion and more preferably has approximately ± fifteen degrees of motion, and provides both forward and rearward motion. The switch 36 preferably provides a range of forward and reverse speed based on the amount the switch 36 is moved, and is more preferably a potentiometer, and most preferably a Model No. J3R-1-5K potentiometer made by Sakea Tsushin Kogyo Co., LTD. in Kawasaki-City, Japan. The motor controller 44 automatically determines trim for the control 36 exercising the motor controller software.

The low speed is generally suitable for using the hand truck in a two wheel mode, and the high speed is generally suitable for using the hand truck in a four wheel mode. Additionally, an additional high speed lockout may be built into the latch receiving member (see FIG. 2) to prevent high speed operation in the two wheel mode. Preferably, low speed is between approximately one Miles Per Hour (MPH) and approximately three MPH and high speed is between approximately three MPH and approximately five MPH. More preferably, low speed is approximately two MPH and high speed is approximately three and one half MPH. The indicator 33 provides off/on information, and motor controller 44 diagnostic information (in the form of a number of blinks at turn-on). The control 36, switch 36a, and indicator 33 may be hard wired to the motor controller 44, or one or more of the control 36, switch 36a, and indicator 33 may communicate wirelessly with the motor controller 44. A wireless connection may be especially useful for a convertible hand truck (see FIGS. 1B, 1B, and 2) where excess wires may be snagged or damaged. A first touch point 62a resides on the handle 26 near the speed control 36 at a location graspable by an operator during normal hand truck operation. The touch point 62a is electrically connected to a processor 66 (see FIG. 9) and provides a safety feature which slows down the hand truck if the operator is not holding the handle 26. In a wireless version of the control circuit, a transmitter circuit 60 (see FIG. 9) resides in the handle 26 or in a box throttle 52.

The optional hi/low speed switch 36a selects one of two speeds programmed into the motor controller 44. The optional on/off switch 36b provides the same function as the on/off switch 51 (see FIG. 5C).

Figure 7A:
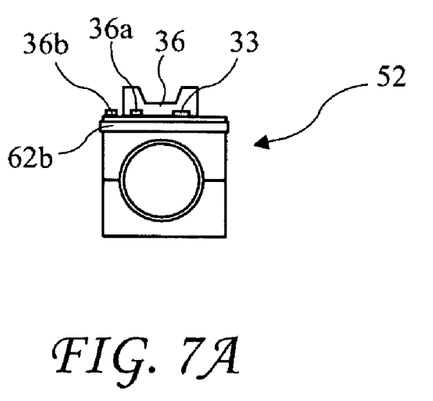
FIG. 7A is an end view of a grip mountable speed control according to the present invention.
Figure 7B:
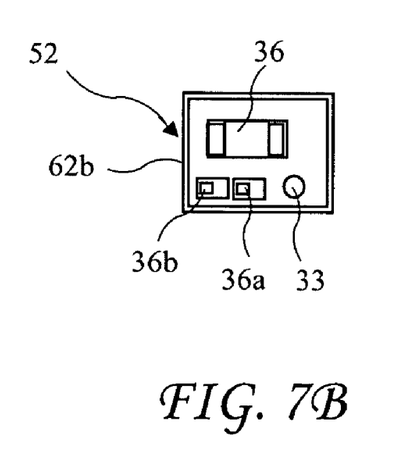
FIG. 7B is a top view of a grip mountable speed control according to the present invention.

The speed control 36, the hi/low speed switch 36a, the optional on/off switch 36b, and the indicator 33 may also be mounted on a separate box throttle 52 as shown in FIGS. 7A and 7B. Such box throttle 52 may be attached to any substantially round profile frame portion of the hand truck, for example, the convertible frame 24 (see FIGS. 1A, 1B, or 2), and may be arbitrarily rotated about a mounting point. A second touch point 62b wraps around the sides of the box throttle 52 just below a top surface and in a location graspable by an operator during normal hand truck operation. The touch point 62b may protrude from the sides of the box throttle 52 be flush with the sides of the box throttle 52, or be slightly recessed into the sides of the box throttle 52. In a wireless version of the control, the transmitter circuit 60 (see FIG. 8) resides in or proximal to the box throttle 52.

Figure 8:
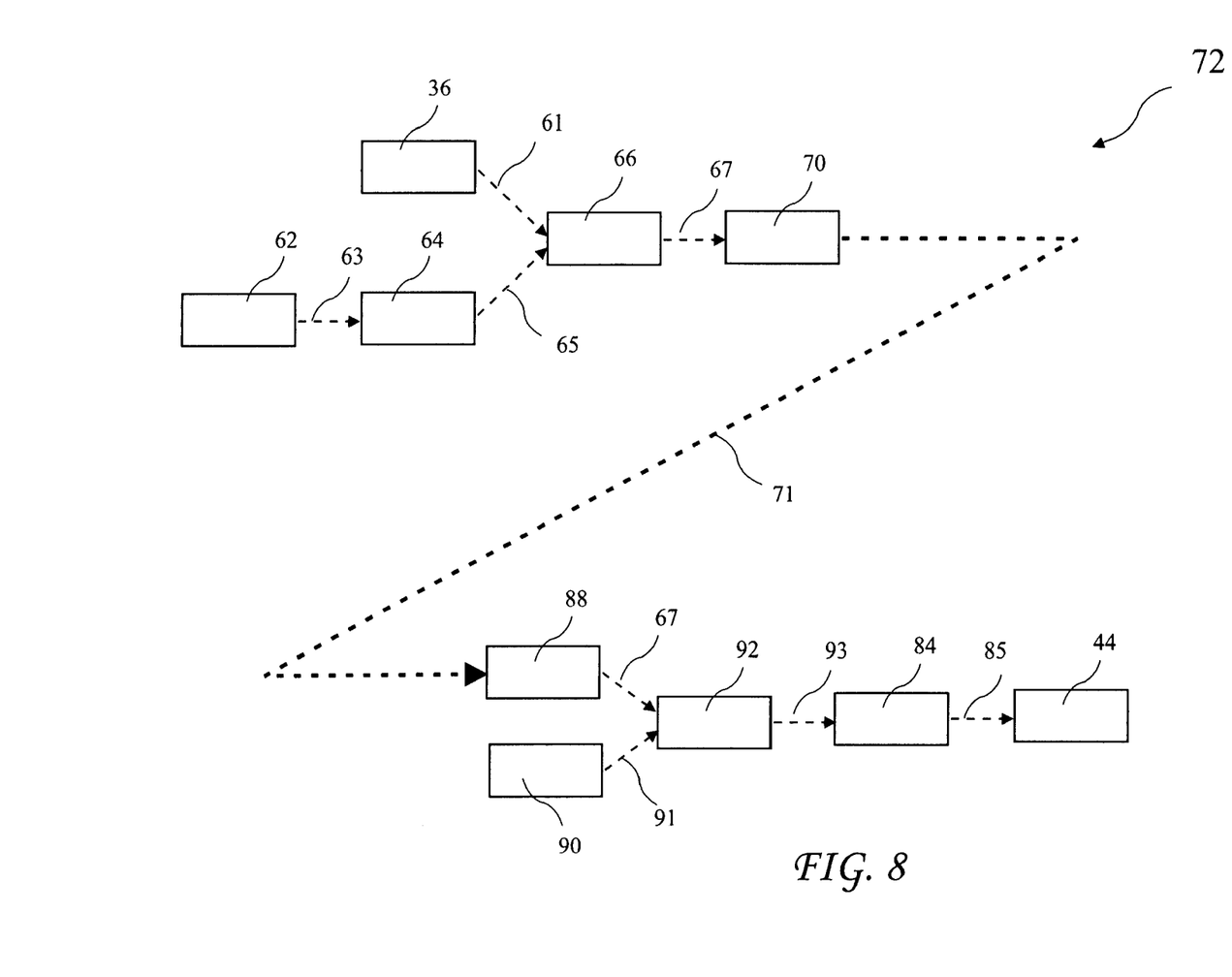
FIG. 8 is a wireless control system according to the present invention for the powered hand truck.

A block diagram of a wireless control system 72 according to the present invention for the powered hand truck is shown in FIG. 8. The control system 72 includes at least one touch point 62 providing a touch point signal 63 to a timer 64. The timer 64 determines how long the touch point signal 63 has been absent, and after a period of time T1 sends a timer signal 65 to a first processor 66 indicating that the operator is not present. The time T1 is preferably approximately ¾ seconds. The speed control 36 sends a speed control command 61 to the processor 66 indicating the actuation of the speed control 36 by the operator. The processor 66 generates a wireless speed control signal 67 as described in FIG. 11, and provides the wireless speed control signal 67 to a radio transmitter 70 which transmits a signal 71. The processor 66 preferably includes a first code in the wireless speed control signal 67 to identify that the signal 71 is a valid signal.

A radio receiver 88 receives the transmitted signal 71 and provides the wireless speed control signal 67 to a second processor 92. A voltage regulator 90 provides a regulated power signal 91 to the processor 92. The processor 92 processes the wireless speed control signal 67 as described in FIG. 12 and generates a potentiometer control signal 93 provided to an electronic potentiometer 84. The potentiometer 84 provides a controller speed command 85 to the controller 44.

Figure 9:
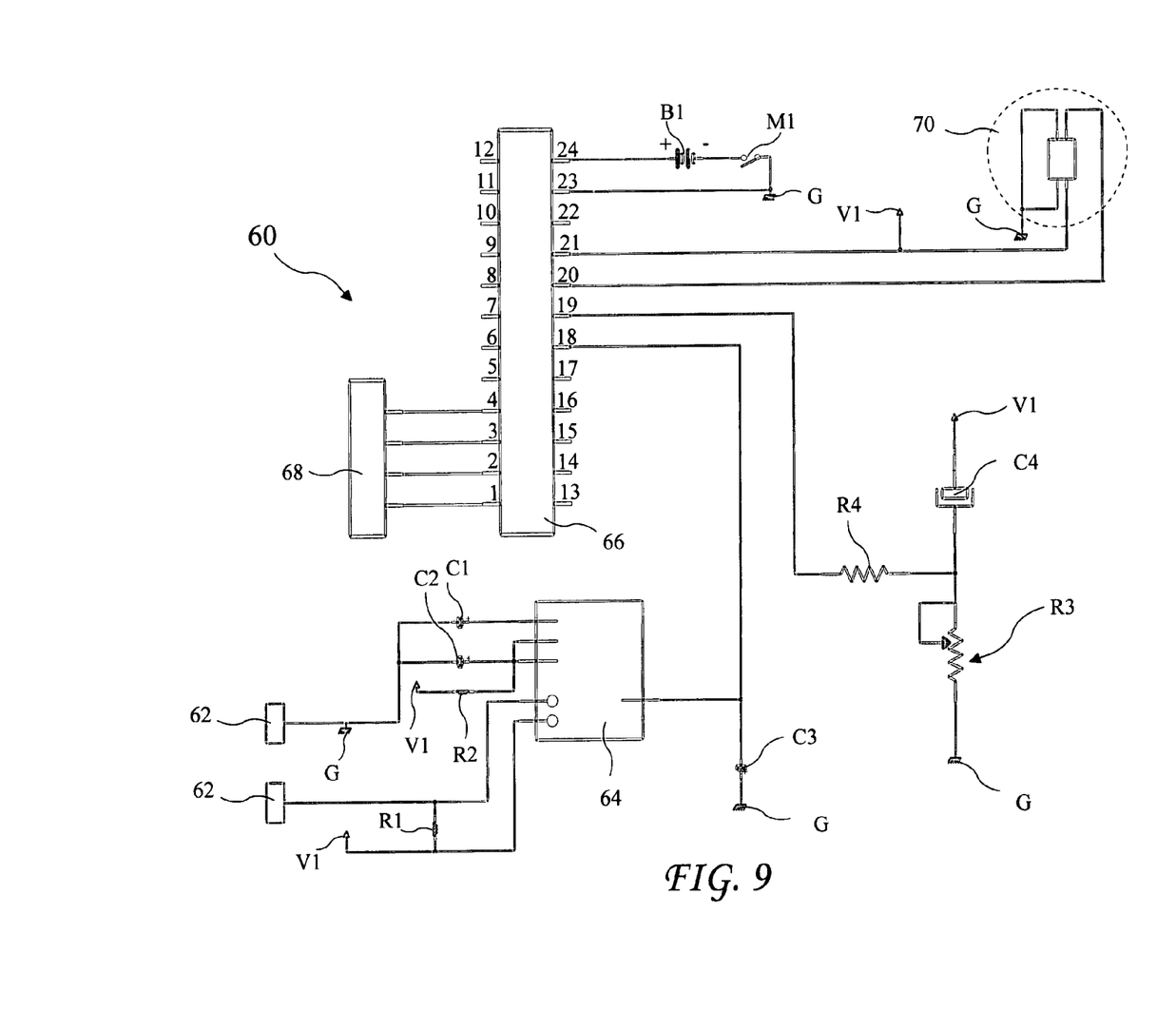
FIG. 9 is a wireless control transmitter circuit according to the present invention for the powered hand truck.

A wireless control transmitter circuit 60 according to the present invention for the powered hand truck is shown in FIG. 9. The circuit 60 includes a first processor 66 which receives a potentiometer signal from a potentiometer R3 and sends a transmitter signal to a radio transmitter 70. The transmitter signal includes a unique code which prevents speed changes due to random signals. The potentiometer signal is preferably between approximately zero and approximately five volts, and a zero speed command corresponds to approximately 2.5 volts. The potentiometer is mechanically biased to a center position corresponding to 2.5 volts. A four pin connector 68 is electrically connected to the processor 66 to allow programming of the processor 66.

Touch points 62 are electrically connected to a timer 64. The timer 64 is a touch detection device. When the operator touches the handle 26 or box throttle 52, the timer 64 detects the presence of the operator and sends a touch signal to the processor 66. If the operator is not touching the handle 26 or the box throttle 52, then after a short period of time, preferably approximately ¾ seconds, the touch signal switches from HIGH (enable speed) to LOW (disable speed) and the processor initiates a gradual deceleration (see FIG. 11.) Various ground points G are provided and voltage sources V1 are provided.

The radio transmitter 70 may be, for example, a Parallax 433 MHz RF Transmitter model number 27980 made by Parallax, Inc. in Rocklin, Calif., or a similar transmitter. The processor 66 may be, for example, a basic stamp processor, and is preferably a BS2PX24 made by Parallax, Inc. in Rocklin, Calif. The timer 64 may be, for example, a Fairchild NE555 made by Fairchild Semiconductor in South Portland, Me. Parameters for the remaining transmitter circuit elements are shown in Table 1.

TABLE 1

Transmitter Circuit Elements

| References | Value | Description |
| --- | --- | --- |
| C1, C2 | 0.01 uF 10 V | Capacitor |
| C3 | 0.1 uF 10 V | Capacitor |
| C4 | 0.15 uF 10 V | Capacitor |
| R1 | 20 M ⅛ W | Resistor |
| R2 | 100K ⅛ W | Resistor |
| R3 | 5K Ohm | Resistor |
| R4 | 220 Ohm ⅛ W | Resistor |
| 68 | 4-Pin Header | Connector |
| B1 | 6-12 VDC | Battery |
| 66 | BS2PX24 | CPU (processor) |
| 64 | NE555 | Timer |
| 70 | RF XTR | Radio Transmitter |
| M1 | SPST | Switch |
| G | 0 voltage | Ground |
| V1 | +5 Volts DC | Regulated Voltage |

Figure 10:
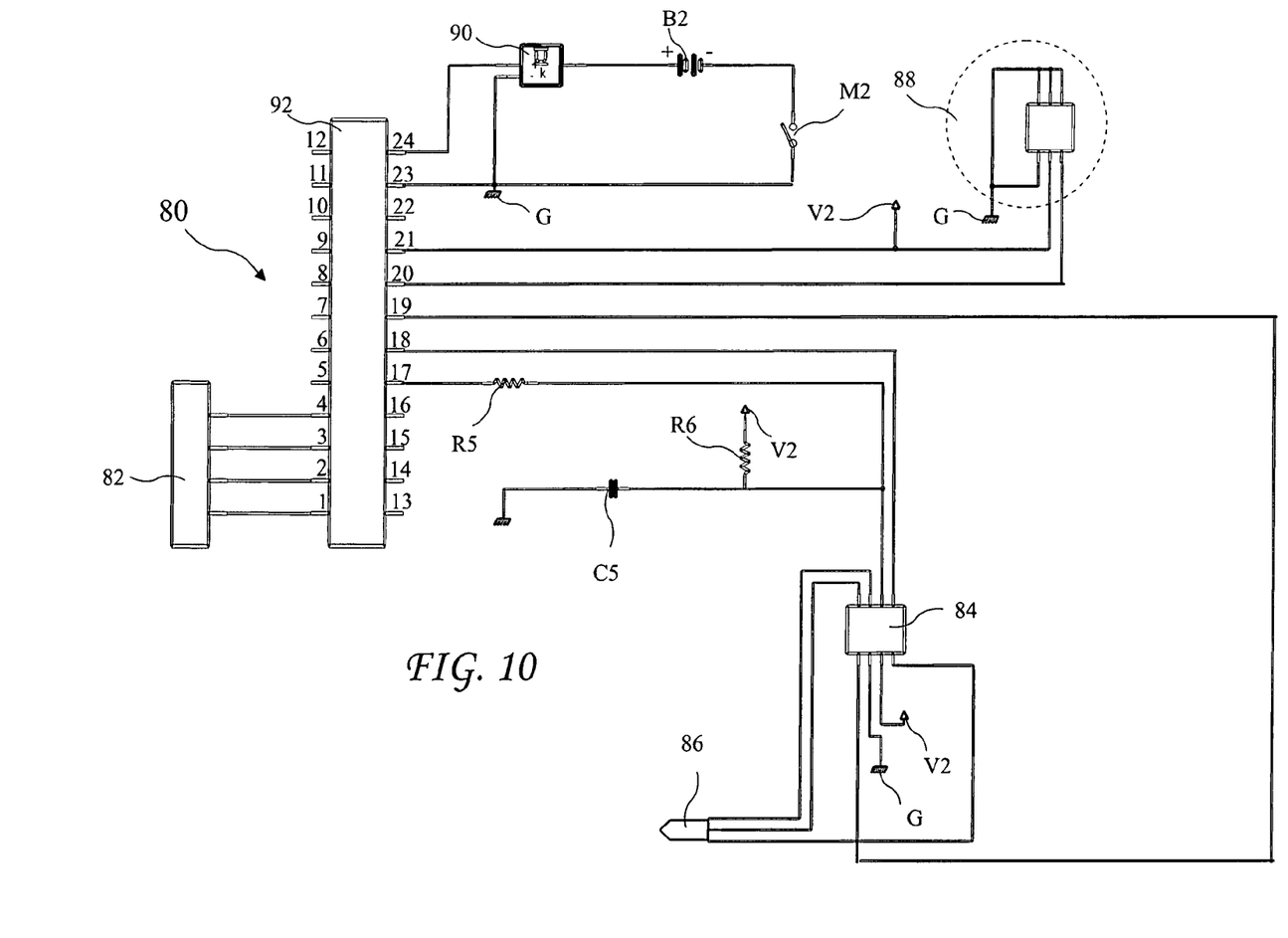
FIG. 10 is a wireless control receiver circuit according to the present invention for the powered hand truck.

A wireless control receiver circuit 80 according to the present invention for the powered hand truck is shown in FIG. 10. Power is provided to the receiver circuit 80 by a second battery B2 through a regulator 90. A radio receiver 88 receives signals transmitted by the radio transmitter 70 (see FIG. 9). The received signal is provided to a second processor 92. A four pin connector 82 is electrically connected to the processor 92 to allow programming of the processor 92. The processor 92 provides a potentiometer control signal to an electronic potentiometer 84 which provides a voltage signal to the motor controller 44. The potentiometer control signal is preferably a serial signal.

The receiver may be, for example, a Parallax 433 MHz RF Receiver model number 27981 made by Parallax, Inc. in Rocklin, Calif., or a similar receiver. Parameters for the remaining receiver circuit elements are shown in Table 2.

TABLE 2

Receiver Circuit Elements

| References | Value | Description |
| --- | --- | --- |
| C5 | 0.1 uF 10 VDC | Capacitor |
| R6 | 10 M Ohm ⅛ W | Resistor |
| R5 | 220 Ohm ⅛ W | Resistor |
| B2 | 24 VDC | Battery |
| 82 | 4-Pin Header | Connector |
| 84 | AD5160 | Electronic Potentiometer |
| 92 | BS2PX24 | CPU (processor) |
| 90 | LM7810 | Voltage regulator |
| 88 | RF REC | Radio Receiver |
| M2 | SPST | Switch |
| G | 0 voltage | Ground |
| V2 | +5 Volts DC | Regulated Voltage |

Figure 11:
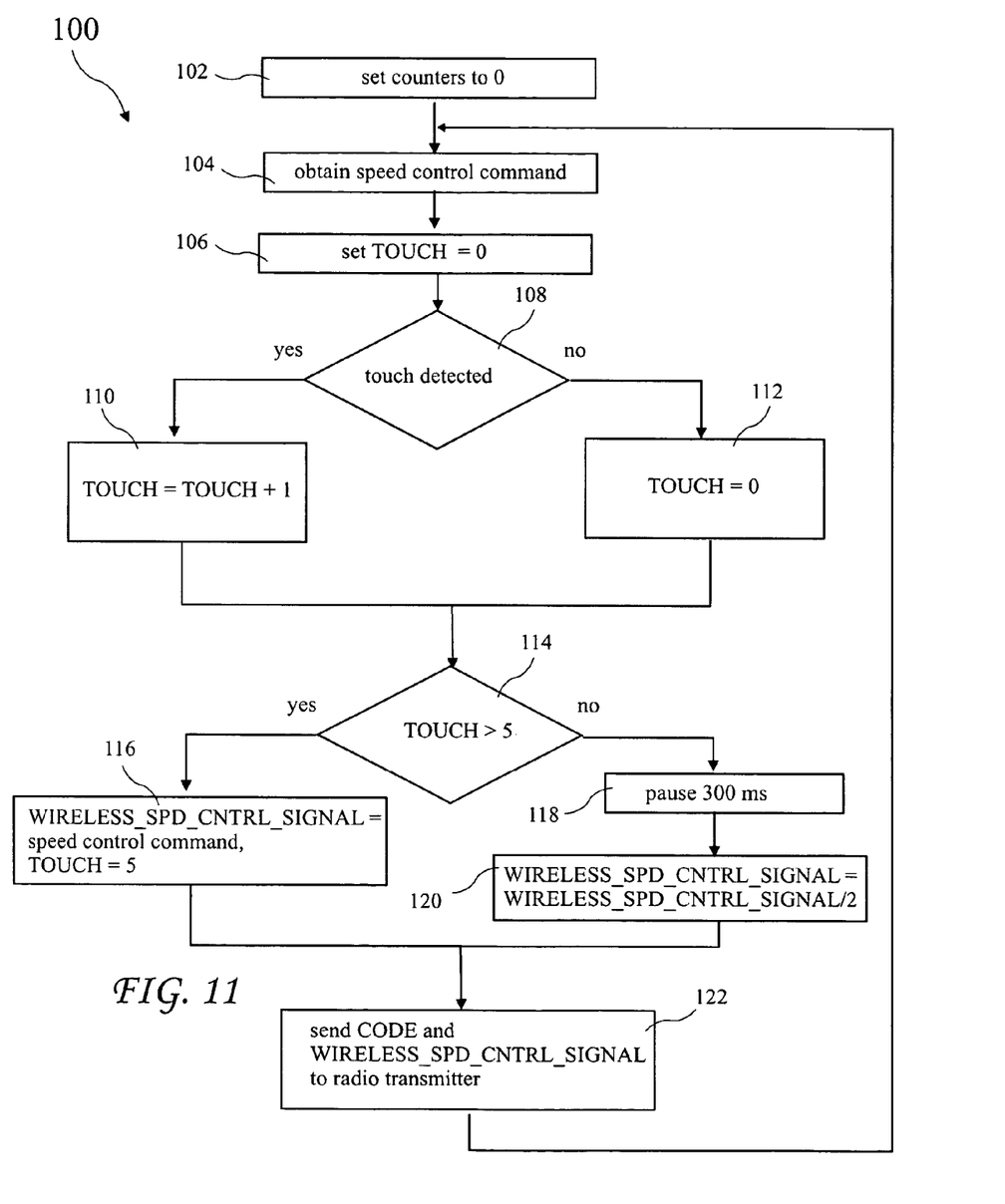
FIG. 11 is a flow chart of the wireless transmitter operation.

A method 100 for generating a wireless signal 71 is described in FIG. 11. At system start-up, all counters are set to zero at step 102. The speed control command 61 is obtained at step 104. A TOUCH and NO_TOUCH counter is set to zero at step 106. If a touch (e.g., the operator's presence) is indicted at step 108, the TOUCH counter is increased by one at step 110, otherwise, the TOUCH counter is set to zero at step 112. In either case, if the TOUCH counter is greater than 5 at step 114, the WIRELESS_SPD_CNTRL_SIGNAL 67 is set to the speed control command 61 and the TOUCH counter is set to five at step 116, otherwise, after a 300 ms pause at step 118, the WIRELESS_SPD_CNTRL_SIGNAL 67 is set to half the previous WIRELESS_SPD_CNTRL_SIGNAL 67 at step 120. In either case, the WIRELESS_SPD_CNTRL_SIGNAL 67 and a CODE are sent to the transmitter 70 to transmit (see FIG. 9) at step 122 and the method loops back to step 104.

Figure 12:
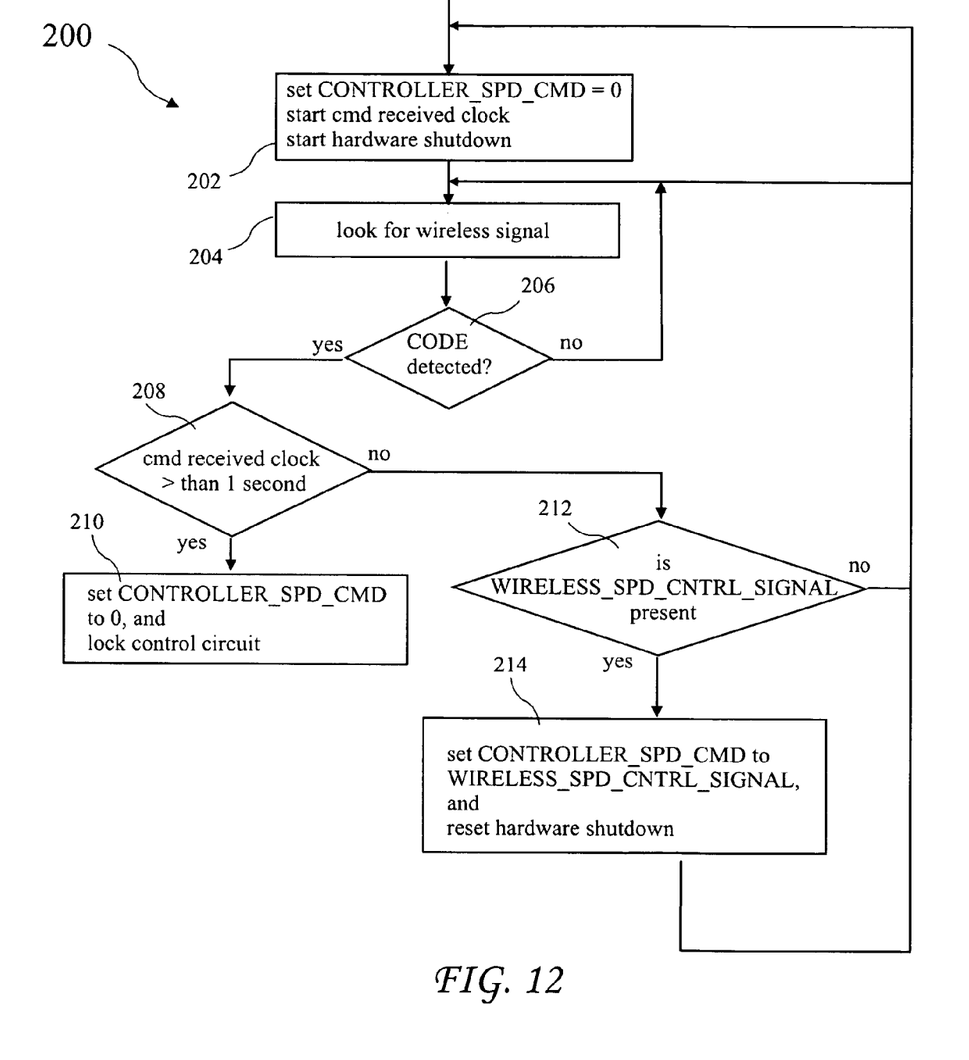
FIG. 12 is a flow chart of the wireless receiver operation.

A method 200 for processing the wireless signal 71 and controlling the motor controller 44 is described in FIG. 12. A CONTROLLER_SPD_CMD is set to zero, a command received clock is started, and a hardware shutdown is started at step 202. The hardware shut down is preferably implemented in the receiver circuit 80 (see FIG. 10) and is more preferably an RC circuit comprising the capacitor C5 and the resister R6. The receiver looks for the signal 71 in step 204. A received signal is compared to the CODE in step 206. If the CODE is present, the command received clock is compared to a period of time, preferably approximately one second, at step 208. If the command received clock is greater than the period of time, the CONTROLLER_SPD_CMD is set to zero, and the system is locked until unlocked by the operator at step 210. If the command received clock is not greater than the period of time, the signal is tested to determine if the wireless speed control signal 67 is present at step 212. If the WIRELESS_SPD_CNTRL_SIGNAL 67 is present, the CONTROLLER_SPD_CMD is set to the WIRELESS_SPD_CNTRL_SIGNAL 67 and the hardware shutdown is reset. If the wireless speed control signal 67 is not present at step 212, the method 200 returns to step 202.

While the FIGS. 8-12 have described a wireless control system, some of the features, for example the touch points, may be used with a wired control to provide a safety advantage. For example, the use of the mechanical potentiometer R3 (see FIG. 9) as a throttle and the use of the electronic potentiometer 84 (see FIG. 10) to provide a voltage signal to the motor controller 44.

While the invention herein disclosed has been described by means of specific embodiments and applications thereof, numerous modifications and variations could be made thereto by those skilled in the art without departing from the scope of the invention set forth in the claims.

I claim:
1. A powered hand truck comprising:
a hand truck frame;
a handle for steering the hand truck;
an electric motor for powering the hand truck;
a transaxle driven by the electric motor and having differentially connected right and left axles;
right and left wheels attached to the right and left axles respectively;
a power source for providing electrical power for the motor;
a motor controller for controlling the electrical power provided to the motor;
an operator actuated speed control attached to the handle and generating a speed control command;

at least one touch point residing proximal to the speed control at a location graspable by the operator during normal hand truck operation and generating a touch point signal; and a control circuit receiving the speed control command from the speed control and the touch point signal from the touch point and providing a motor controller speed command to the motor controller, wherein the motor controller speed command is decreased if the touch point signal indicates that the operator is not touching at least one of the touch points, and wherein the control circuit includes:

a transmitter circuit including a radio transmitter, the transmitter circuit in electrical cooperation with the operator actuated speed control; and a receiver circuit including a radio receiver, the receiver circuit in electrical cooperation with the motor controller;

a wireless speed control signal is generated in the transmitter circuit based on the speed control command and transmitted from the radio transmitter to the radio receiver; and the controller speed command is generated in the receiver circuit based on the wireless speed control signal, wherein the wireless speed control signal further includes a first code which is compared to a second code stored in the receiver circuit, and the wireless speed control signal is ignored if the codes do not match.

2. The powered hand truck of claim 1, wherein the controller speed command is set to zero and the control circuit is locked if the first code is not detected for a period of time.

3. The powered hand truck of claim 2, wherein once locked, the control circuit remains locked until unlocked by the operator.

4. The powered hand truck of claim 1, wherein:

the control circuit periodically tests at a period P for the presence of the touch point signal; and the motor controller speed command is decreased by half if the touch point signal is not present.

5. The powered hand truck of claim 1, wherein:

the control circuit periodically tests at a period P for the presence of the touch point signal;

a touch counter is increased by one if the touch point signal is present;

the touch counter is set to zero if the touch point signal is not present; and the motor controller speed command is set to the speed control command if the touch counter exceeds a positive threshold count.

6. A powered hand truck comprising:

a hand truck frame;

a handle for steering the hand truck;

an electric motor for powering the hand truck;

a transaxle driven by the electric motor and having differentially connected right and left axles;

right and left wheels attached to the right and left axles respectively;

a power source for providing electrical power for the motor;

a motor controller for controlling the electrical power provided to the motor;

an operator actuated speed control attached to the handle and generating a speed control command;

at least one touch point residing proximal to the speed control at a location graspable by the operator during normal hand truck operation and generating a touch point signal;

a control circuit receiving the speed control command from the speed control and the touch point signal from the touch point and generating a potentiometer control signal, wherein the potentiometer control signal is decreased if the touch point signal indicates that the operator is not touching at least one of the touch points;

an electronic potentiometer receiving the potentiometer control signal from the control circuit and providing a voltage signal to the motor controller based on the potentiometer control signal; and the control circuit updates the potentiometer control signal when a new speed control signal is received, and periodically reduces the potentiometer control signal if a new speed control signal is not received after a period of time, wherein the control circuit periodically tests at a period P for the presence of the touch point signal; and the potentiometer control signal is decreased by half if the touch point signal is not present.

7. The powered hand truck of claim 6, wherein the potentiometer control signal is set to zero and the control circuit is locked if a valid speed control command is not detected for a period of time.

8. The powered hand truck of claim 7, wherein once locked, the control circuit remains locked until unlocked by the operator.

9. A powered hand truck comprising:

a hand truck frame;

a handle for steering the hand truck;

an electric motor for powering the hand truck;

a transaxle driven by the electric motor and having differentially connected right and left axles;

right and left wheels attached to the right and left axles respectively;

a power source for providing electrical power for the motor;

a motor controller for controlling the electrical power provided to the motor;

an operator actuated speed control attached to the handle and generating a speed control command;

at least one touch point residing proximal to the speed control at a location graspable by the operator during normal hand truck operation and generating a touch point signal;

a control circuit receiving the speed control command from the speed control and the touch point signal from the touch point and generating a controller speed command, wherein the controller speed command is periodically decreased if the touch point signal indicates that the operator is not touching at least one of the touch points and the controller speed command is set to zero and the control circuit is locked if a valid speed control command is not detected for a period of time; and a motor controller receiving the controller speed command from the control circuit and provides electrical power to the electric motor.

10. The powered hand truck of claim 9, wherein once locked, the control circuit remains locked until unlocked by the operator.

11. The powered hand truck of claim 9, wherein:

the control circuit periodically tests at a period P for the presence of the touch point signal; and the speed control command is decreased by half if the touch point signal is not present.

12. The powered hand truck of claim 9, wherein:
the control circuit periodically tests at a period P for the presence of the touch point signal;
a touch counter is increased by one if the touch point signal is present;
the touch counter is set to zero if the touch point signal is not present; and
the speed control command is set to the speed control command if the touch counter exceeds a positive threshold count.

13. A powered hand truck comprising:
a hand truck frame;
a handle for steering the hand truck;
an electric motor for powering the hand truck;
a transaxle driven by the electric motor and having differentially connected right and left axles;
right and left wheels attached to the right and left axles respectively;
a power source for providing electrical power for the motor;
a motor controller for controlling the electrical power provided to the motor;
an operator actuated speed control attached to the handle and generating a speed control command;
at least one touch point residing proximal to the speed control at a location graspable by the operator during normal hand truck operation and generating a touch point signal;
a control circuit receiving the speed control command from the speed control and the touch point signal from the touch point and generating a potentiometer control signal, wherein the potentiometer control signal is decreased if the touch point signal indicates that the operator is not touching at least one of the touch points;
an electronic potentiometer receiving the potentiometer control signal from the control circuit and providing a voltage signal to the motor controller based on the potentiometer control signal; and
the control circuit updates the potentiometer control signal when a new speed control signal is received, and periodically reduces the potentiometer control signal if a new speed control signal is not received after a period of time, wherein:
the control circuit periodically tests at a period P for the presence of the touch point signal;
a touch counter is increased by one if the touch point signal is present;
the touch counter is set to zero if the touch point signal is not present; and
the potentiometer control signal is set to the speed control command if the touch counter exceeds a positive threshold count.

\* \* \* \* \*